Jan. 12, 1960 H. T. FRIIS ET AL 2,921,272

FINLINE COUPLER

Filed Feb. 2, 1955 2 Sheets-Sheet 1

INVENTORS H. T. FRIIS
S. D. ROBERTSON

BY Arthur J. Torsiglieri

ATTORNEY

INVENTORS H. T. FRIIS
S. D. ROBERTSON
BY
Arthur J. Torsiglieri
ATTORNEY 2,921,272

FINLINE COUPLER

Harald T. Friis, Rumson, and Sloan D. Robertson, Fair Haven, N.J., assignors to Bell Telephone Laboratories, Incorporated, New York, N.Y., a corporation of New York Application February 2, 1955, Serial No. 485,672

7 Claims. (Cl. 333—6)

The present invention relates to extremely wide band coupling arrangements for use in transferring electromagnetic wave energy between two hollow conductive wave guides, and more particularly to such coupling arrangements having polarization selective characteristics.

It is well known in the field of communication that the amount of signal information which may be transmitted over any wave path is a function of the bandwidth of the path. A common practice in the communication art is to transmit a large number of separate messages over a common wave path, each message being transmitted at a different frequency range, and to detect each message separately by the use of receiving equipment which is sensitive only to the frequency range of a given message. It is apparent in such a system that the development of transmission facilities capable of transmitting extremely broad frequency ranges will greatly increase the number of separate messages which may be faithfully transmitted simultaneously. In wave transmission through hollow conductive wave guides, it is found that these hollow wave guides can accommodate signal frequencies over a range of many thousands of megacycles. However, some of the advantage of the extremely broad band characteristics of such a wave transmission path is lost as the result of narrow band coupling arrangements which have been proposed heretofore for coupling energy between two hollow wave guides, either at the transmitter or receiver, or at some repeater station or the like along the transmission path. It would appear, therefore, that further progress in the direction of increasingly broader band transmission is being inhibited by the lack of sufficiently broad band coupling arrangements for coupling energy between two hollow wave guides.

It is the principal object of the present invention, therefore, to improve the technique for coupling high frequency wave energy between two hollow wave guides over extremely broad frequency bands.

Moreover, it has been found that the amount of signal information which can be transmitted through a hollow wave guide can be increased by transmitting simultaneously two separate signals of the same frequency range, each signal carrying a distinct message. In particular, it has been found that two separate messages of the same frequency range can be successfully transmitted simultaneously without intermodulation along a single hollow wave guide by launching the two signal waves so that their electric vectors are mutually perpendicularly polarized. Then, by selectively coupling on the basis of the direction of polarization of the electric vector to only one of the two signal waves this signal wave will be derived. A coupling arrangement adapted for selecting a particular signal wave on the basis of the direction of polarization of its electric field vector shall be referred to as a polarization selective coupler. It is generally characteristic of prior art polarization selective couplers which are adapted for coupling two hollow wave guides that they do not achieve sufficiently broad band operation.

Accordingly, a broad object of the invention is to increase the frequency range over which polarization selective coupling may be achieved between two hollow conductive wave guides.

It is found in high frequency wave transmission that a serious obstacle to faithful wave propagation in hollow wave guides and particularly in circular wave guides, has been the inability to effect a bend in the direction of wave propagation along a wave guide without exciting spurious modes. A wave propagating along a circular wave guide in the dominant electric mode tends to degenerate into higher order spurious modes when traversing a bend in the wave guide, or if the dimensions of the guide are such as to inhibit the excitation of higher order modes, a portion of the wave energy disadvantageously tends to be converted to a transverse state of polarization resulting in the formation of an elliptical or circular mode. The transfer of energy from the dominant mode to the various spurious modes is thereby effected. This results not only in a loss of energy from the dominant mode which contains the desired information to be transmitted, but substantial interference of the spurious modes with the dominant mode and hence a considerable loss in the fidelity of transmission of the signal intelligence.

In another aspect, a further object of the present invention is to effect a change in direction of propagation of the energy propagating along a hollow wave guide without the excitation of spurious modes.

In accordance with the broad principles of the invention, wave energy propagating along a main hollow wave guide is coupled to a second hollow wave guide by the use of a finline coupling structure. The finline structure includes two thin coplanar metal fins positioned to extend into each of the hollow wave guides in a plane parallel to or including, the axis of each wave guide. The fins are closely spaced over a portion of their length to form along the interspace therebetween a narrow wave path in this region and are tapered at each end. The tapered section at one end matches the characteristic impedance of the main wave guide to the characteristic impedance of the closely spaced section and the tapered section at the other end of the finline matches the characteristic impedance of the closely spaced section to the characteristic impedance of the second hollow wave guide.

In an illustrative embodiment of the present invention for use as a coupling arrangement, a finline structure is utilized for coupling wave energy between two hollow conductive wave guides. The finline structure comprises two thin coplanar conductive fin elements spaced apart along their entire length and having their opposing surfaces serve as boundaries to form a continuous wave path between the two hollow wave guides. The opposing surfaces are spaced to form first and second tapered sections of wave path and a narrow section of wave path intermediate the tapered sections along the continuous wave path. The first tapered section extends along a longitudinal plane within the first hollow wave guide and is tapered gradually from the transverse dimension of the first hollow wave guide to the transverse dimension of the narrow section of wave path, and the second tapered section extends along the longitudinal plane within the second hollow wave guide and is tapered gradually from the transverse dimension of the second hollow wave guide to the transverse dimension of the narrow section of wave path. It is especially important to have a smooth continuous wave path between the two hollow wave guides if broad band operation is desired.

In a second illustrative embodiment of the present invention two finline structures are used in conjunction for negotiating a bend in the direction of wave propagation between two sections of hollow wave guide. The finlines are positioned to extend into the two wave guide sections in mutually perpendicular planes. Since the technique is particularly applicable for use in circular wave guides, it will be convenient for purposes of explanation to consider the case where finline couplers are positioned to extend into two sections of circular wave guide in the horizontal and vertical planes of each section. Electromagnetic wave energy propagating along the first section of a wave guide will be divided between the two finline structures according to the polarity of the wave, that is, the horizontal component of such a wave will be coupled to the horizontally positioned finline and the vertical component will be coupled to the vertically positioned finline. The wave energy is then made to follow any convenient curved path while propagating along each of the finlines and, after effecting the desired bend, the horizontal and vertical components of the waves are then recombined in the second section of wave guide. It is important, in order to obtain the original wave undistorted, that the electrical length of the wave path used for executing the bend be the same for each of the two components of the wave.

A more complete understanding of the nature of the invention, together with a better appreciation of its features and advantages, will best be obtained by a study of the following detailed description when read in connection with the accompanying drawings, in which.

Figure 1:
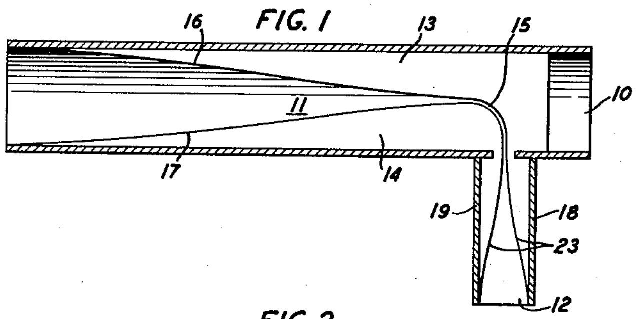
Fig. 1 shows a longitudinal section of a finline coupler for coupling wave energy between two hollow wave guides in accordance with the present invention.
Figure 1A:
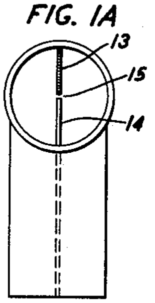
Figs. 1A, 2A, 3A and 4A are end views taken from the left end of the finline coupler of Figs. 1, 2, 3, and 4, respectively.

Referring now more particularly to the drawings, Figs. 1 and 1A illustrate an extremely broad band finline coupler for coupling electromagnetic wave energy between a main circular hollow wave guide 10 and a second hollow wave guide 12. This coupler comprises two thin coplanar conductive fins 13 and 14 spaced apart along their entire length. This arrangement of two fins shall herein be referred to as a "finline" or "finline structure" and the wave path provided therealong shall be referred to as a "finline wave path." Moreover, the term "finline coupler" shall be used to designate any coupler which includes a finline or finline structure. The two fins 13 and 14 are closely spaced along a portion of their length to form along the interspace therebetween a narrow wave path 15 in this region. Each of the fins is tapered away from the closely spaced region 15 along the main hollow wave guide 10 to form an impedance matching section between this closely spaced region and the main hollow wave guide. The tapers 16 and 17 are preferably several wave lengths long at the lowest operating frequency, their optimum contour may be computed for any set of operation conditions according to well known design formula. Advantageously, the fins taper to merge smoothly with the walls of the wave guide.

Moreover, the smooth tapered sections may be replaced by a succession of steps which form successive quarter wavelength matching sections, approaching the characteristics of the tapered section as the number of steps along the finline is increased.

Fins 13 and 14 project through an aperture in the wall of wave guide 10 to connect with the conductive surfaces 18 and 19 respectively of wave guide 12. The closely spaced section 15 of finline 11 preferably extends outside the confines of wave guide 10 and is terminated by a tapered section 23 wherein fins 13 and 14 are smoothly tapered outwardly toward the inner surfaces of wave guide 12. By extending the closely spaced region outside of the main hollow wave guide the energy propagating along the finline wave path is maintained confined in the extremely narrow path and is substantially unaffected by the discontinuity presented by the transition at the aperture connecting the two wave guides. To this end, the wave energy may be more closely confined to the closely spaced section 15 by the insertion of dielectric material between the fins along this section. Moreover, by positioning the transition from the finline to the second hollow wave guide 12 outside of the confines of the main wave guide, the geometric discontinuity occasioned by this transition will tend not to excite spurious modes along the main wave guide.

In operation an electromagnetic wave propagating along wave guide 10 whose electric vector is parallel to the plane of finline 11 will pass along the finline wave path being smoothly coupled to wave guide 12 whereas a wave whose electric vector is perpendicular to finline 11 will continue along wave guide 10 substantially unaffected by the finline. The long tapered sections 16 and 17 of the finline effect a gradual change in the field configuration of the wave polarized in the plane of the fins from the mode of propagation characteristic of the circular wave guide 10, which ordinarily will be the dominant mode for a circular wave guide, to the mode of propagation characteristic of the narrow wave path 15, which is similar to the mode of propagation along a parallel two-conductor line. The field configuration along wave path 15 is then gradually changed to the mode for propagation characteristic of the second hollow wave guide by the tapered section 23.

In a circular wave guide of two inches diameter coupling over a frequency band from 3,750 to 12,300 megacycles has been obtained using fins having a thickness of approximately 1/16 of an inch and spaced approximately 1/64 of an inch along their closely spaced section. This fin thickness is less than two percent of the wavelength of the lowest frequency wave which can propagate through wave guide 10, i.e., the cut-off wavelength of that guide.

Figure 2:
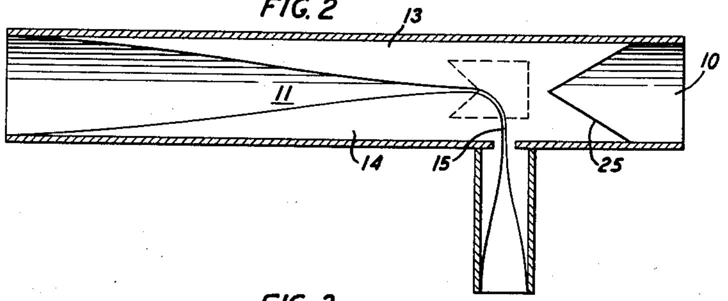
Fig. 2 shows a longitudinal section of a modification of the finline coupler shown in Fig. 1.
Figure 2A:
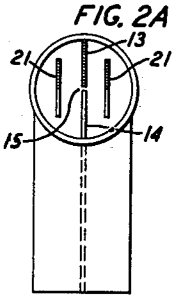

A modification of the finline coupler described above is shown in Figs. 2 and 2A. In this modification thin plates 21 of lossy material are advantageously provided on either side of the finline structure 11 for inhibiting the excitation of spurious modes along the curved portion of the finline wave path. It will be apparent to one skilled in the art that there may be substituted other structures for inhibiting the excitation of spurious modes, such as the tapering of the hollow wave guide in the region of the finline to obtain a narrow guide dimension transverse to the plane of the finline adjacent the curved region of the finline wave path. Additionally, in the present modification, the right end 25 of fin 13 is tapered in order to minimize any slight disturbance in the transmission of a wave polarized in the plane perpendicular to the plane of the fins.

A second embodiment of the finline coupler described above is shown in Figs. 3 and 3A. In this embodiment, two finline structures are positioned to be coextensive along a main hollow wave guide 110. A first finline 111 is positioned to extend along the longitudinal plane parallel to, but displaced to one side of, the axis of wave guide 110. This finline comprises two fins 113 and 114 closely spaced along a portion of their length and tapered in the direction away from the closely spaced section 115 for matching the characteristic impedance of the closely spaced section to the characteristic impedance of the main wave guide 110. The right end 125 of fin 113 is tapered in order to minimize any disturbance in the transmission of a wave polarized perpendicular to the plane of the finline, as explained with reference to Fig. 2. Fins 113 and 114 are connected to surfaces 118 and 119, respectively, of a second wave guide 112 in the manner described with reference to Fig. 1. A second finline structure 211 of the same type is positioned parallel to finline 111 and coextensive therewith along wave guide 110 but on the other side of the wave guide axis. The second finline is also connected to the surfaces of wave guide 112 as described above.

By maintaining each of the finlines 111 and 211 sufficiently thin, polarization selectivity will be obtained, as explained with reference to Fig. 1. Furthermore, by appropriately displacing finlines 111 and 211 from the wave guide axis the excitation of spurious modes can be effectively inhibited. For example, by positioning the finlines at the nodal points for the $TE_{12}$ modes (that is, appropriately adjusting dimensions *a*, *b*, and *c* of Fig. 3A) excitation of the $TE_{12}$ mode will be severely impeded. As is known to workers in the art, these nodal points represent points of minimum coupling to the $TE_{12}$ mode and yet are points of high coupling for the dominant $TE_{11}$ mode of the circular guide. Moreover, not only is the excitation of the $TE_{12}$ mode effectively impeded by positioning the two finlines at nodal points in this mode, but there are inhibited other higher order modes, such as the $TE_{01}$, $TE_{21}$, and $TE_{31}$ modes, whose field configuration is such that their electric vector is oppositely directed at the position of the two finlines.

It can be appreciated by one skilled in the art that by a proper choice of the number and location of a plurality of parallel finlines, the coupling to any particular mode of propagation may be minimized. Likewise, by a proper choice of these parameters the coupling to any particular mode may be maximized. Furthermore, the output from each of the parallel finlines of the present embodiment may be coupled to separate hollow wave guides where it is desired to couple portions of the propagating wave energy to separate utilization circuits.

Figure 3:
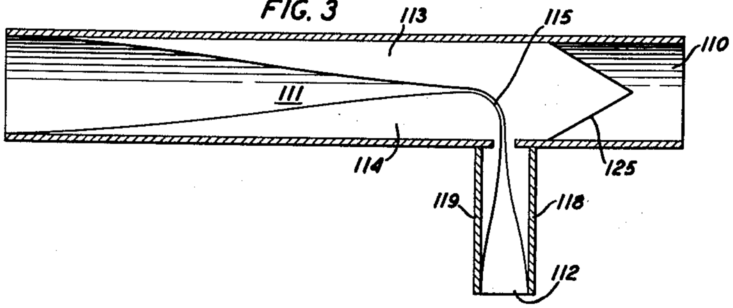
Fig. 3 shows a longitudinal section of a second embodiment of the present invention forming a wave guide to wave guide finline coupler.
Figure 3A:
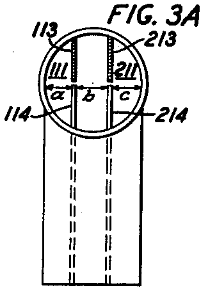

It can be appreciated further that the tapered sections of the finlines 111 and 211 of Fig. 3 may be oppositely directed so that one of the finlines couples to wave energy passing in one direction along wave guide 110 and the other finline couples to wave energy passing in the opposite direction along the wave guide. Such a system is useful for measuring techniques where a portion of the energy passing along a main hollow wave guide to a given load is coupled via one of the finlines to monitoring equipment, the remaining portion of the wave energy continuing on to the load. Thereafter a portion of the wave energy reflected from the load, and therefore passing in the opposite direction along the main wave guide, is coupled via the second finline to additional monitoring equipment for measuring the amount of energy reflected. In this manner, the standing wave ratio and other characteristics of a transmission path can readily be determined.

Figures 4, 4A:
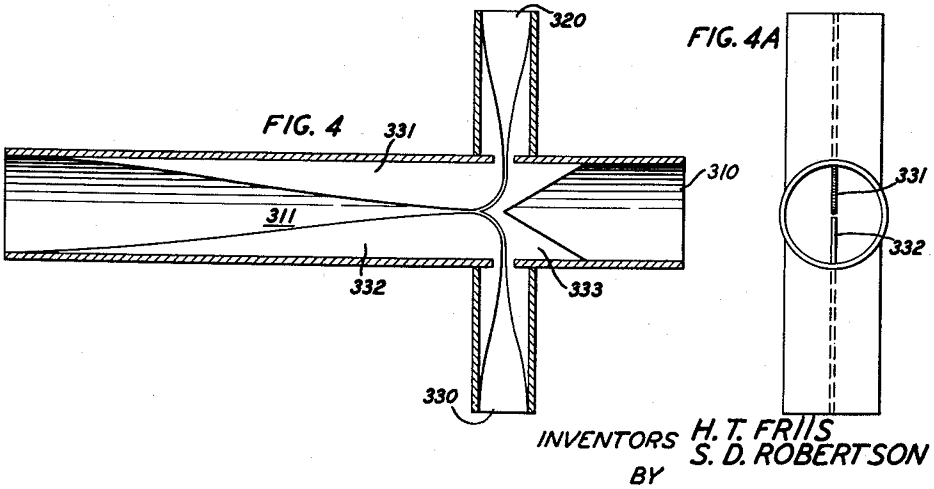
Fig. 4 shows a longitudinal section of a finline coupler in accordance with the present invention for providing a wave guide T section.

A further embodiment of the finline coupler described above is shown in Figs. 4 and 4A. In this embodiment a finline structure is arranged to provide a T junction for use in coupling a main hollow wave guide and two branch wave guides. Finline structure 311, comprising fins 331, 332, and 333, is positioned along the length of a main wave guide 310 for coupling energy between the main wave guide and two branch wave guides 320 and 330. Fins 331 and 333 are closely spaced along a portion of their length for providing a narrow wave guiding path between the main wave guide 310 and branch wave guide 320. Likewise fins 332 and 333 are closely spaced over a portion of their length for providing a narrow wave path between the main wave guide 310 and branch wave guide 330. Fins 331 and 332 are tapered along the main wave guide in a direction away from the closely spaced sections for providing an impedance matching section between the closely spaced sections and the main wave guide 310. In a similar manner fins 331 and 333 are tapered along branch wave guide 320 in a direction away from their closely spaced section, and fins 332 and 333 are tapered along the branch wave guide 330 in a direction away from their closely spaced section, to provide impedance matching sections into the corresponding branch wave guide from the closely spaced regions. Fin 333 is tapered at its right end for minimizing disturbances in the transmission of a wave polarized perpendicular to the plane of finline 111.

In operation a wave passing from left to right along main wave guide 310 and polarized in the plane of finline 311 will be coupled along this finline to the branch wave guides 320 and 330. However, wave energy propagating from left to right along main wave guide 310 and polarized in a plane perpendicular to finline 311 will pass substantially undisturbed through the region of the finline structure 311 and continue propagating along this main wave guide. The proportion of wave energy received by each of the finline branches will be a function of their relative impedances. Modifications of this coupler to provide a multi-branch coupler having more than two branches may be made by one skilled in the art according to the principles of the present invention.

Figure 5:
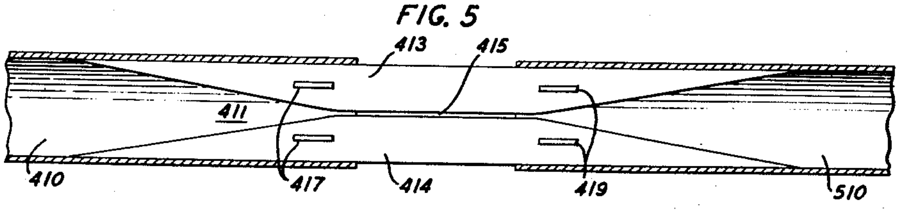
Fig. 5 shows a longitudinal section of another embodiment of the finline coupler, in accordance with the present invention.

In another embodiment of the present invention shown in Fig. 5, a finline structure is used for coupling electromagnetic wave energy between two hollow wave guides. In this embodiment finline 411 is positioned to extend in a longitudinal plane along the axis of wave guides 410 and 510 for coupling wave energy therebetween. The finline structure comprises fins 413 and 414. These fins are closely spaced along a portion of their length for forming a narrow wave path in the interspace therebetween and are tapered at both ends for matching the characteristic impedance of the closely spaced section 415 to the characteristic impedance of the hollow wave guides. The closely spaced section 415 extends along the portion of the length of the fins which is between the two hollow wave guides and preferably extends into the interior of each of these wave guides.

The finline arrangement of this figure is adapted for coupling a wave which is polarized in the plane of the finline structure. A wave of such polarity will be coupled via finline 411 between wave guides 410 and 510. It is characteristic of this coupling arrangement that the wave guides may be moved horizontally or vertically, or may be twisted, with respect to each other without affecting wave propagation, so long as fins 413 and 414 do not contact each other. By rotating one of the wave guides 90 degrees with respect to the other wave guide, thereby putting a 90 degree twist in finline 411, a 90 degree change in polarization will be experienced when going from one of the hollow wave guides to the other.

Plates 417 and 419 of lossy material are positioned along wave guides 410 and 510, respectively. The plane of the plates is perpendicular to finline 411 and one plate is placed on either side of the finline wave path remote from the field of the wave propagating along the finline wave path. Any wave energy propagating from left to right along wave guide 410 and polarized in a plane perpendicular to finline 411 will be attenuated by the lossy plates 417 to prevent reflection thereof at the termination of the wave guide. The lossy plates 419 serve in the same manner to attenuate any transversely polarized wave energy in wave guide 510.

Figure 6:
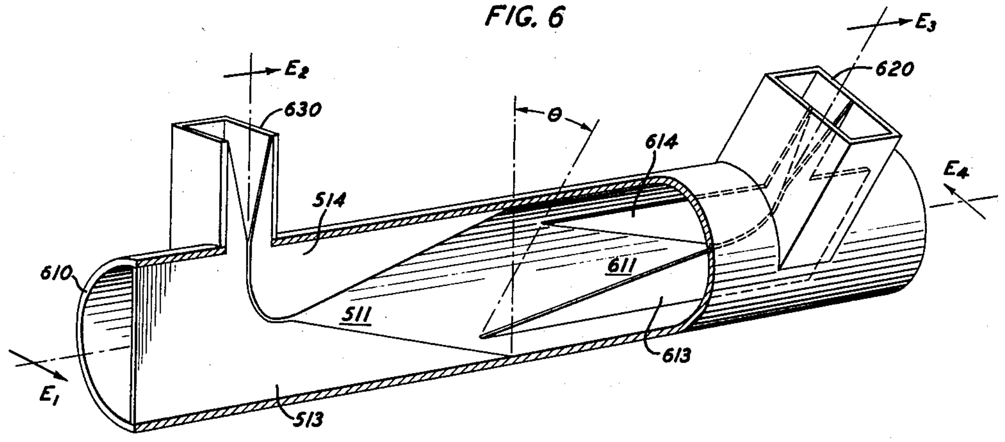
Fig. 6 is a cut-away perspective view of an embodiment of the finline structure of the present invention which serves as a power dividing junction.

In accordance with another aspect of the present invention two finlines are spaced apart along a hollow wave guide as shown in Fig. 6 to form a power dividing finline coupler. In this figure, a first finline 511 comprising fins 513 and 514 is positioned to extend along the longitudinal axial plane within a hollow wave guide 610, as explained with reference to Fig. 1. A second finline 611 comprising fins 613 and 614 is spaced apart from finline 511 along the wave guide axis and is positioned to extend along the second longitudinal axial plane within wave guide 610, the plane of the second finline being rotated at a predetermined angle $\theta$ with respect to the plane of the first finline. The angle $\theta$ may be either adjustable or fixed in accordance with the end to be effected.

By fixing the angle of rotation between the two finlines at 45 degrees a hybrid junction will be obtained. In such an arrangement wave energy propagating from left to right along wave guide 610 and polarized as shown by vector $E_1$ will pass by finline 511 undisturbed and upon reaching finline 611 half of the energy will be coupled via the finline wave path along finline 611 to wave guide 620 as shown by vector $E_3$, and half of the wave energy will continue propagating along wave guide 610 undisturbed by finline 611, as shown by vector $E_4$. The original wave represented by vector $E_1$, being polarized at an angle 45 degrees from finline 611, may be thought of as comprising two electric field vector components, each having a magnitude of .707 times the original vector, one being in the plane of finline 611 and one being perpendicular thereto. It can be seen that the component in the plane of the finline will be coupled via the finline to the second wave guide 620, whereas the perpendicular component, which is represented by vector $E_4$ in Fig. 6, will pass substantially unaffected through the region of the finline and continue along the main wave guide. Thus, for a wave having an electric vector 45 degrees from the plane of the fins the finline serves as a 3 db coupler, coupling half of the wave energy to the second wave guide and allowing half the wave energy to continue propagating along the main hollow wave guide.

In a similar manner wave energy propagating from right to left along wave guide 610 and represented by vector $E_4$ will be divided in two, half of the wave energy being coupled to wave guide 630 as shown by vector $E_2$, and half of the wave energy continuing along the main wave guide polarized as shown by vector $E_1$. Likewise, wave energy introduced at wave guide 630 as shown by vector $E_2$ will be divided in half and propagate as $E_3$ and $E_4$ and wave energy introduced at wave guide 620 as shown by vector $E_3$ will be divided in half and propagate as $E_1$ and $E_2$. The circular wave guide 610 of Fig. 6 may be connected at each end to a section of rectangular wave guide, the wide dimension of the rectangular wave guide sections being perpendicular to the electric vectors $E_1$ and $E_4$ at the respective ends of wave guide 610. In such an arrangement a transition section may be advantageously interposed between the rectangular and circular wave guide sections for smoothly changing from the rectangular mode propagation to the circular mode propagation along the power dividing coupler.

Figure 7:
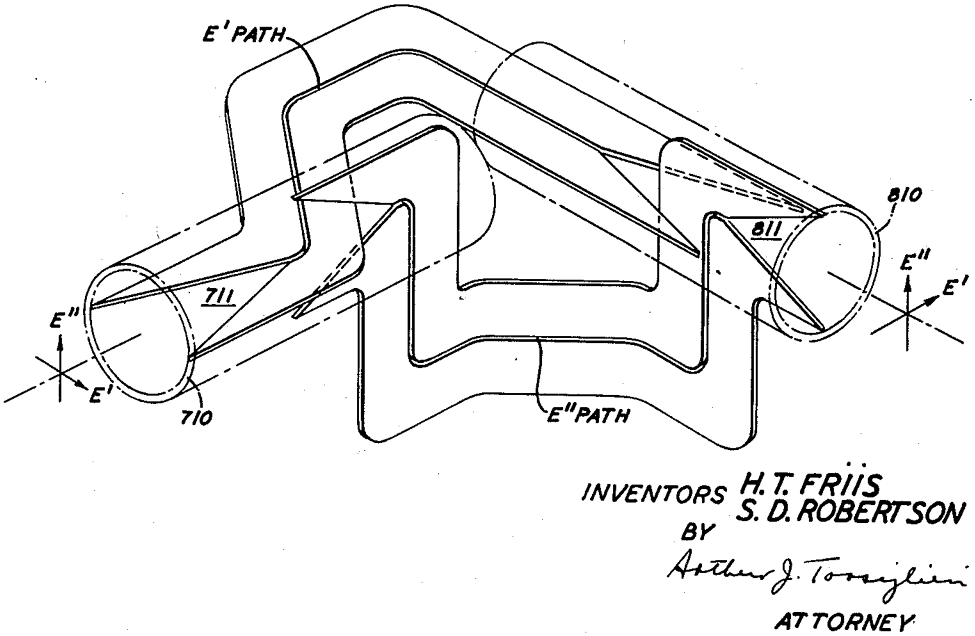
Fig. 7 is a perspective of a finline coupler in accordance with the present invention which serves as a bend for a hollow wave guide, the two sections of wave guide being shown in phantom.

In another aspect of the present invention as shown by Fig. 7, the finline structure may be embodied in a finline coupler for effecting a bend in the direction of wave propagation along a hollow wave guide. As previously discussed, the problem of effecting a bend without experiencing a degeneracy of the wave into spurious modes has been particularly severe in a circular wave guide, hence the illustrative example of Fig. 7 has been shown for use in connection with two sections of circular hollow wave guide. Moreover, although the bend of Fig. 7 is shown to be approximately 90 degree for convenience, it will be appreciated by one skilled in the art that this coupler will provide a bend of any angle. In the embodiment shown in Fig. 7, finline 711 is positioned to extend along a longitudinal axial plane within both hollow wave guide sections 710 and 810. A second finline 811 of the same type is positioned to extend along a second longitudinal axial plane within both sections of hollow wave guide. The plane of finline 811 is substantially perpendicular to the plane of finline 711 in each of the sections of hollow wave guide and the two finlines are spaced apart in each of the sections of wave guide along the respective wave guide axes. For applications where space is a premium, it is feasible to telescope the two finlines in the respective sections of hollow wave guide to a point where they overlap a substantial amount.

In operation a wave propagating from left to right along the first hollow wave guide 710 and polarized in the plane of finline 711 (as shown by the vector $E^1$ of Fig. 7) will be coupled to the second wave guide 810 via finline 711. Likewise a wave propagating in the plane of finline 811 (as shown by the vector $E^{11}$ of Fig. 7) will be coupled via finline 811 to wave guide 810. Thus two distinct waves having perpendicularly polarized electric vectors can be effectively coupled simultaneously between two angularly disposed sections of hollow wave guide. In such a case, however, it is important that the electric vector of each of the two waves be closely aligned with the corresponding one of the mutually perpendicularly positioned finlines.

The finline coupler of Fig. 7, also may be used to couple a single wave whose electric field vector lies neither in the plane of finline 711 nor finline 811 but is somewhere between these two planes. In such a case, the component of the wave which lies in the plane of finline 711 along first wave guide 710 will be coupled via this finline to the second wave guide 810. Whereas, the component of a wave which lies in the plane perpendicular to finline 711 along wave guide 710, and therefore in the plane of finline 811 will be coupled to wave guide 810 via finline 811. The two components are then recombined in wave guide 810 to form the original signal wave. The separation of the components of the wave takes place in wave guide 710 at the beginning of finline 711, where one of the components separates to follow the path of finline 711, and the recombination of the components takes place in wave guide 810 at the termination of finline 811. It will be observed from Fig. 7 that the wave paths for each of the components of the wave, after the separation and before the recombination, includes a section of hollow wave guide and a finline. By making the electrical length of the two wave paths equal the signal wave will be faithfully transmitted to the second section of wave guide. Moreover, this condition can advantageously be made, independent of frequency, if corresponding elements of the two wave paths be equal, that is, if the lengths of the two finlines be made equal and the lengths of the sections of hollow wave guide in the two wave paths be made equal. Various modifications of this embodiment of the invention may be devised by one skilled in the art for effecting the principles set forth herein.

It can be appreciated that a number of separate signal waves, at different frequencies and polarized at various angles, propagating simultaneously along wave guide 710 may be transmitted therefrom to wave guide 810 by the finline coupler of Fig. 7, one component of each wave being coupled through finline 711 and the perpendicularly disposed component being coupled through finline 811.

It is understood that the above described specific embodiments are merely illustrative of the general principles of the invention. Various other arrangements may be devised by one skilled in the art without departing from the sprit and scope of the invention. In particular, the finline structure shown in each of the figures may advantageously be utilized in coupling relation with rectangular hollow wave guides, as well as circular hollow wave guides. Moreover, the embodiment shown in Fig. 3 for forming a T section can be modified to form a junction for joining any number of branch wave guides to a main wave guide. It is understood that the branch wave guides and main wave guide are not necessarily perpendicularly disposed. Furthermore, the principles set forth with reference to Fig. 3 for minimizing the excitation of spurious modes may be utilized in each of the other embodiments. For example, finline 311 of Fig. 4 may be replaced by two or more coextensive parallel finlines as taught by Fig. 3, or finlines 511 or 611 of Fig. 6 may be replaced by a number of coextensive parallel finlines. Further, dielectric material may advantageously be placed along the narrow sections of finline wave path of each of the embodiments disclosed for more effectively confining the electric field propagating along the finline, as discussed with reference to Fig. 1.

Arrangements utilizing finlines for coupling between a hollow wave guide and a coaxial transmission line are described in a copending application Serial No. 485,671 by S. D. Robertson.

What is claimed is:

1. In combination, a hollow uniconductor wave guide of circular cross-section and a hollow uniconductor wave guide of rectangular cross-section, each having an opening communicating with the interior thereof, and means forming a continuous wave path for coupling wave energy between said hollow wave guides comprising two thin coplanar fin elements extending longitudinally along a portion of the length of the first wave guide and through a conductive wall of that wave guide into the second wave guide, the two fin elements being spaced apart along their entire length and having a thickness no more than several percent of a wavelength at the cut-off frequency of the first wave guide, the spacing between said fin elements being dimensioned to form a continuous wave path between the two hollow wave guides having first and second tapered end sections and a narrow section intermediate said tapered sections and extending between the interiors of said guides by way of said openings, the first tapered section of wave path extending in an axial plane within the circular wave guide for matching the characteristic impedance of said circular wave guide to the characteristic impedance of the narrow section of wave path, and the second tapered section of wave path extending in a plane parallel to the narrow side of the rectangular wave guide for matching the characteristic impedance of said rectangular wave guide to the characteristic impedance of the narrow section of wave path.

2. In combination, a first hollow conductive wave guide having a circular cross-section of predetermined diameter, a second hollow conductive wave guide of rectangular cross-section and having predetermined transverse dimensions and being positioned to have its axis displaced from the axis of said first hollow wave guide, both of said wave guides having openings communicating with the interiors thereof, and means for coupling wave energy between said first and second hollow wave guides comprising two thin ribbon-like conductive elements coextending from within the first hollow wave guide into the second hollow wave guide by way of said openings, the thickness of each of the two ribbon-like elements being no more than several percent of the cut-off wavelength of the first wave guide, the two ribbon-like elements being spaced apart along their entire length and the spacing therebetween being dimensioned to provide a continuous wave path having first and second tapered sections and a uniformly narrow section intermediate said tapered sections, the first tapered section of wave path extending in an axial plane within the first hollow wave guide and tapered gradually from the transverse dimension of said first hollow wave guide to the transverse dimension of the narrow section of wave path, and the second tapered section of wave path extending in an axial plane within the second hollow wave guide parallel to the electric vector within said second guide and tapered gradually from the transverse dimension of said second hollow wave guide to the transverse dimension of the section of narrow wave path.

3. In combination, a main hollow conductive wave guide having a predetermined transverse dimension, an auxiliary hollow conductive wave guide to be coupled with said main wave guide, both of said wave guides having openings communicating with the interiors thereof, and means for coupling wave energy between said main wave guide and said auxiliary wave guide comprising a plurality of planar finlines coextending along parallel longitudinal planes from the interior of the main hollow wave guide by way of said openings to the interior of the auxiliary hollow wave guide, each of the finlines characterized by having two thin coplanar conductive elements extending between the main wave guiding path and the auxiliary wave guide and spaced apart along their entire length for forming a continuous wave-guiding path in the interspace between said elements, the thickness of each of the two conductive elements being no more than several percent of the cut-off wavelength of the first wave guide, the continuous path being dimensioned to form first and second tapered sections and a narrow section intermediate said tapered sections, the first tapered section extending longitudinally along a portion of the first hollow wave guide for matching the characteristic impedance of said first hollow wave guide to the characteristic impedance of the narrow section of wave path, and the second tapered section extending longitudinally within the second hollow wave guide for matching the characteristic impedance of said second hollow wave to the characteristic impedance of the narrow section of wave path.

4. In combination, first and second hollow conductive wave guides having predetermined transverse dimensions and having openings communicating with the interiors thereof, and two parallel finlines extending from within the first hollow wave guide by way of said openings to within the second hollow wave guide for coupling wave energy between said wave guides, the two finlines coextending along parallel longitudinal planes of each of the two wave guides and being spaced apart approximately one third the transverse dimension of the first wave guide in each of the wave guides, each of the finlines comprising two thin coplanar conductive elements spaced apart along their entire length and having their opposing surfaces form a continuous wave path of the interspace therebetween, the thickness of each of the two conductive elements being no more than several percent of the cut-off wavelength of the first wave guide, the continuous wave path being dimensioned to form first and second tapered sections and a narrow section intermediate said tapered sections and passing through said openings, the first tapered section extending along the first hollow wave guide for matching the characteristic impedance of said first hollow wave guide to the characteristic impedance of the narrow section of wave path, and the second tapered section extending along the second hollow wave guide for matching the characteristic impedance of said second hollow wave guide to the characteristic impedance of said narrow section of wave path.

5. An arrangement for forming a power dividing coupler comprising a main hollow wave guide of circular cross-section, first and second auxiliary wave guides of rectangular cross-section to be coupled with said main hollow wave guide, said main guide and each of said auxiliary guides having openings communicating with the interiors thereof, and first and second planar finlines for coupling wave energy between said main wave guide and said first and second auxiliary wave guides, respectively, by way of pairs of said openings in the respective guides, corresponding ends of the two planar finlines being spaced apart along the axis of the main wave guide, the plane of the first finline being rotated an angle of 45 degrees about the wave guide axis with respect to the plane of the second finline, each of the finlines comprising two thin coplanar conductive elements extending from within the main hollow wave guide to within one of the auxiliary wave guides and spaced apart along their entire length for forming a continuous wave path along the interspace between their opposing surfaces, the thickness of each of the two conductive elements being no more than several percent of the cut-off wavelength of the main wave guide, said opposing surfaces being spaced apart to form first and second tapered end sections of wave path and a narrow section of wave path intermediate said tapered sections, the first tapered section extending along a longitudinal plane within the main hollow wave guide and tapered gradually from the transverse dimension of the main hollow wave guide to the transverse dimension of the narrow section of wave path and the second tapered section extending along a longitudinal plane within one of said auxiliary wave guides parallel to the narrow side thereof and tapered gradually from the transverse dimension of said narrow side of said auxiliary wave guide to the transverse dimension of the narrow section of wave path.

6. An arrangement for forming a power dividing coupler as set forth in claim 5 wherein the corresponding tapered end sections of the two finlines located along the main wave guide axis are oriented in opposite senses.

7. In combination, a main hollow conductive wave guide, a plurality of auxiliary hollow conductive wave guides, each of which has its axis displaced from the axis of said main wave guide, each of said auxiliary wave guides and said main wave guide having openings communicating with the interiors thereof, and means for coupling wave energy between said main wave guide and each of said auxiliary wave guides by way of the respective openings therein comprising a plurality of coplanar conductive fin elements, each of which has a thickness of no more than several percent of a wavelength at the cut-off frequency of the main wave guide, the fin elements being spaced apart from one another along their entire lengths and the spacing between the fins being dimensioned to provide a continuous wave path between the main wave guide and each of the auxiliary wave guides, each of said continuous wave paths initially being equal to the transverse dimension of the main wave guide, then being tapered therefrom to a smaller dimension to traverse said openings, and finally being tapered from said smaller dimension to the transverse dimension of a respective one of the auxiliary wave guides.

References Cited in the file of this patent

UNITED STATES PATENTS

| | | |
|---|---|---|
| 2,514,679 | Southworth | July 11, 1950 |
| 2,546,840 | Tyrrell | Mar. 27, 1951 |
| 2,633,493 | Cohn | Mar. 31, 1953 |
| 2,660,667 | Bowen | Nov. 24, 1953 |
| 2,691,731 | Miller | Oct. 12, 1954 |
| 2,702,366 | Ginzton | Feb. 15, 1955 |